(12) United States Patent
Yajima

(10) Patent No.: US 7,339,612 B1
(45) Date of Patent: Mar. 4, 2008

(54) VIBRATION ISOLATING DEVICE, METHOD, AND SYSTEM FOR CORRECTING IMAGE BLUR IN A CAMERA

(75) Inventor: Shinya Yajima, Omiya (JP)

(73) Assignee: Fujinon Corporation, Saitama (JP)

( * ) Notice: Subject to any disclaimer, the term of this patent is extended or adjusted under 35 U.S.C. 154(b) by 1179 days.

(21) Appl. No.: 09/713,041

(22) Filed: Nov. 16, 2000

(30) Foreign Application Priority Data

| Nov. 16, 1999 | (JP) | 11-325546 |
| Mar. 31, 2000 | (JP) | 2000-098182 |
| Apr. 28, 2000 | (JP) | 2000-129978 |

(51) Int. Cl.
*H04N 5/228* (2006.01)

(52) U.S. Cl. ............... 348/208.7; 348/208.2; 348/208.3; 348/208.5; 396/55

(58) Field of Classification Search .. 348/208.1–208.5, 348/208.99, 208.7, 208.8; 396/55
See application file for complete search history.

(56) References Cited

U.S. PATENT DOCUMENTS

| 5,585,875 A * | 12/1996 | Imafuji et al. ............... 396/55 |
| 5,598,246 A | 1/1997 | Miyamoto et al. |
| 5,617,177 A * | 4/1997 | Imafuji et al. ............... 396/53 |
| 5,634,145 A * | 5/1997 | Ohishi et al. ............... 396/55 |
| 5,717,611 A * | 2/1998 | Terui et al. ............... 702/150 |
| 5,758,202 A | 5/1998 | Amanuma et al. |
| 5,771,406 A | 6/1998 | Sakamoto et al. |
| 5,794,078 A * | 8/1998 | Okazaki ............... 396/50 |
| 5,831,671 A * | 11/1998 | Chigira et al. ............... 348/208.8 |
| 5,890,018 A * | 3/1999 | Terui ............... 396/55 |
| 6,148,150 A * | 11/2000 | Yajima et al. ............... 396/55 |
| 6,208,377 B1 * | 3/2001 | Morofuji et al. ............... 348/208.8 |
| 6,332,060 B1 * | 12/2001 | Miyamoto et al. ............... 396/55 |
| 6,630,950 B1 * | 10/2003 | Ohkawara et al. ............... 348/208.12 |

FOREIGN PATENT DOCUMENTS

| JP | 6-118469 | * 4/1994 |
| JP | 6118469 | 4/1994 |
| JP | 1184450 | 3/1999 |
| JP | 11284900 | 10/1999 |

* cited by examiner

*Primary Examiner*—Lin Ye
*Assistant Examiner*—Chriss S Yoder, III
(74) *Attorney, Agent, or Firm*—Birch, Stewart, Kolasch & Birch, LLP

(57) ABSTRACT

A vibration isolator determines a speed of a vibration applied to a camera with a vibration speed sensor, and differentiates and integrates the speed, and corrects the integrated value to zero when the differentiated value is zero, and determines the position of the correcting optical system according to the integrated value. Thus, an oscillation center of the correcting optical system is appropriately set at the origin, and an unwanted influence due to noise components in an output signal from the vibration speed sensor can be eliminated. Therefore, the vibration isolator can appropriately prevent an image blur.

34 Claims, 14 Drawing Sheets

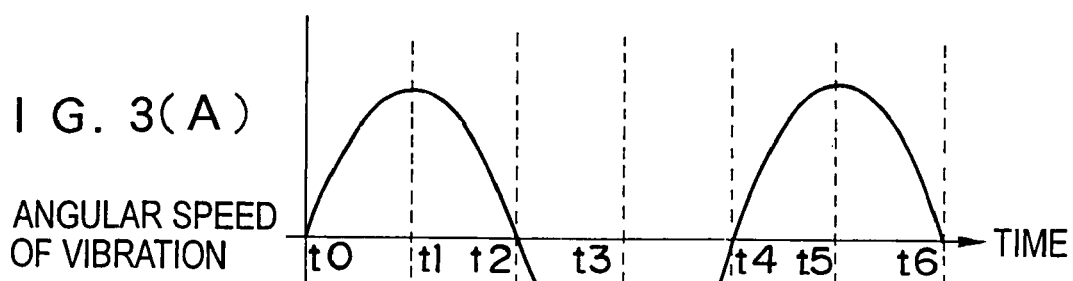
F I G. 3(A)
ANGULAR SPEED OF VIBRATION
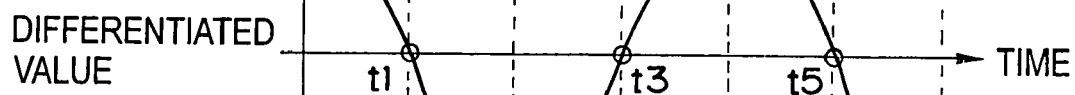
F I G. 3(B)
DIFFERENTIATED VALUE
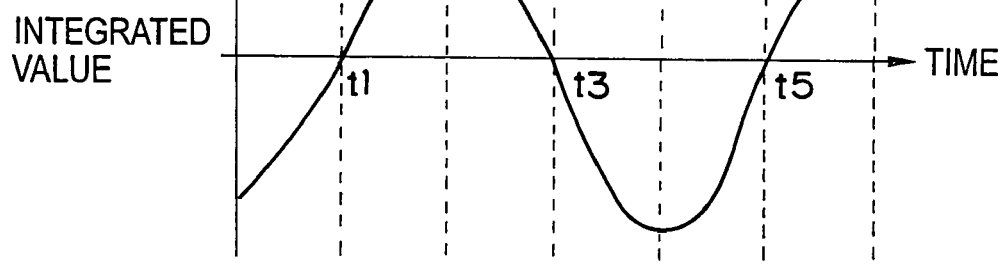
F I G. 3(C)
INTEGRATED VALUE

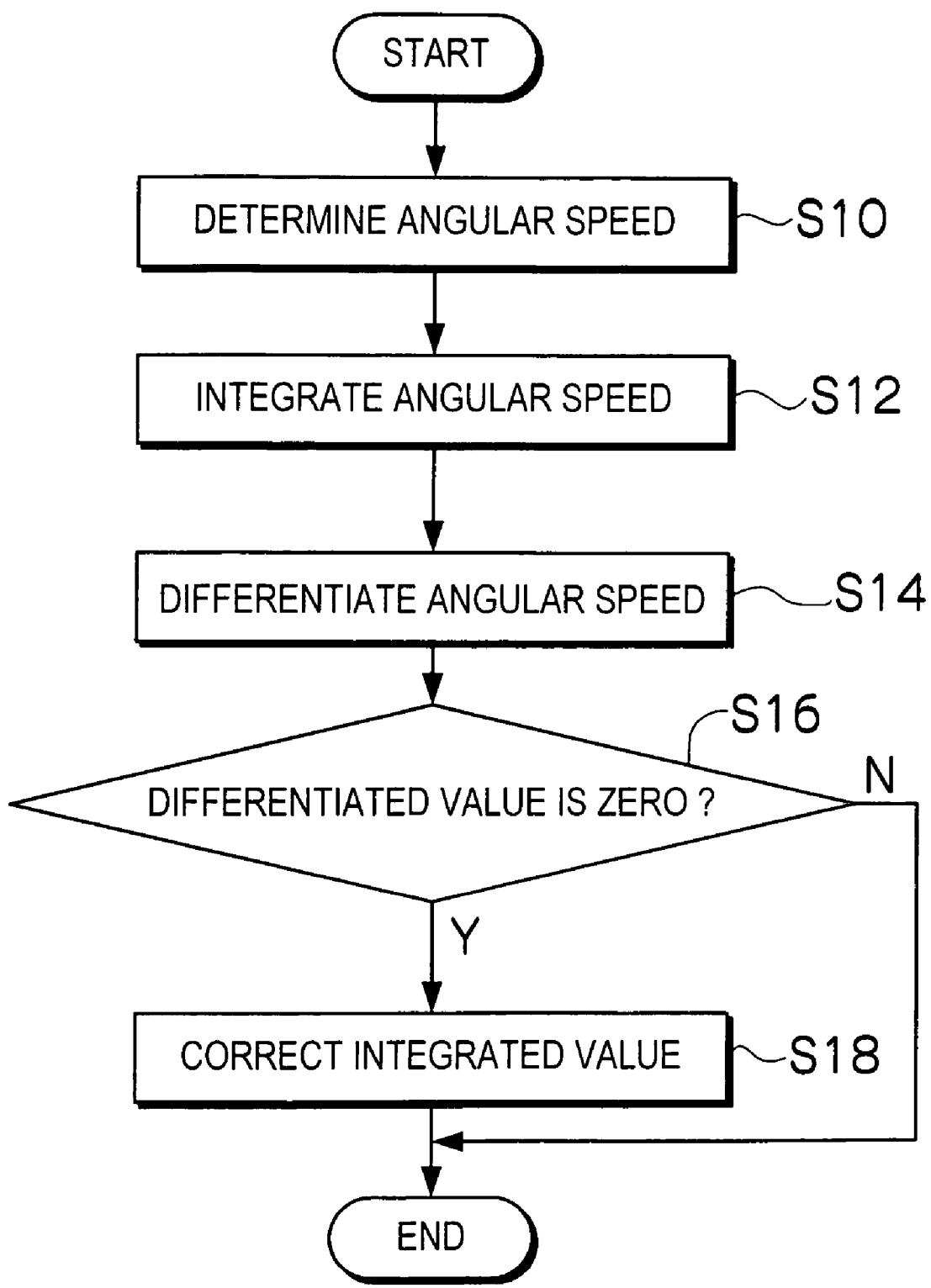
F I G. 4

F I G. 8
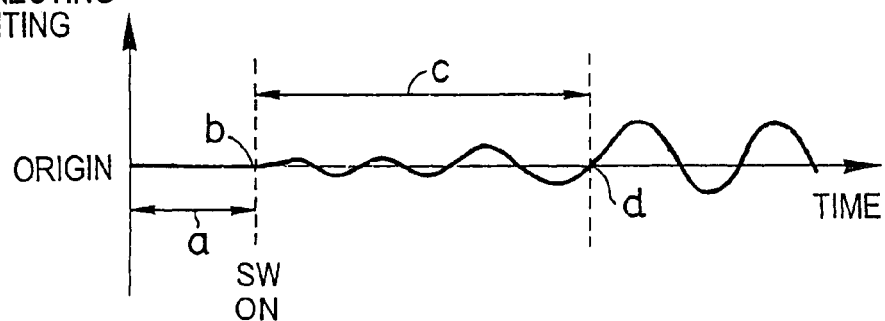
F I G. 9
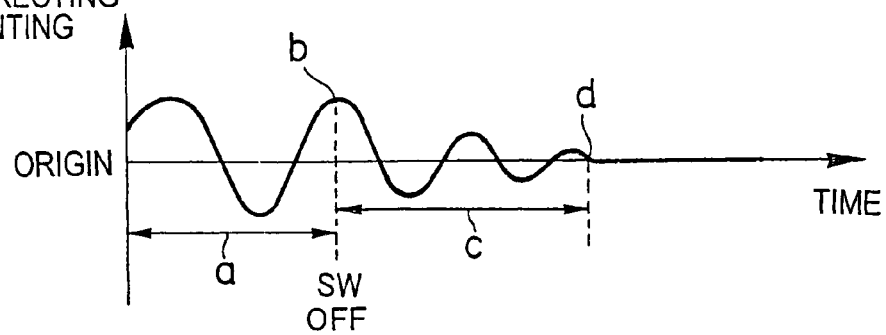

VIBRATION ISOLATING DEVICE, METHOD, AND SYSTEM FOR CORRECTING IMAGE BLUR IN A CAMERA

BACKGROUND OF THE INVENTION

1. Field of the Invention

This invention relates generally to a vibration isolator, and more particularly to a vibration isolator that prevents an image blur due to a vibration of a TV camera by moving a correcting lens.

2. Description of Related Art

Conventionally, a vibration isolator for a TV camera supports a correcting lens that is movable within a plane that is perpendicular to an optical axis in a lens barrel. When the camera is vibrated, actuators move the correcting lens in such a direction as to cancel the vibration to prevent an image blur. The vibration applied to the camera is determined by vibration speed sensors (angular speed sensors or speed sensors) provided in a camera body or the lens barrel.

Japanese Patent Provisional Publication No. 6-118469 discloses a method of appropriately eliminating an error of correction for drift (change of output from a sensor as time passes) of a vibration speed sensor that determines a vibration applied to a camera.

Japanese Patent No. 2918537 discloses a vibration isolator that twice integrates a signal outputted from an acceleration sensor of a camera with an integrator and moves a correcting lens in a direction that is opposite from that of the movement (vibration) of the camera according to the output from the integrator with a driving device (voice coil).

In the vibration isolator, when the vibration isolation is OFF, no signal is inputted to the driving device and the correcting lens is kept at a specific position. When the vibration isolation is turned ON and a signal starts being inputted to the driving device according to the vibration, the signal discontinuously changes. As a result, the correcting lens suddenly moves and an image blur occurs. To address this problem, the signal has a predetermined value (zero) for keeping the correcting lens at the specific position when the vibration isolation is turned ON, and the value is changed according to the output signal from the integrator. In this case, a differential amplifier is connected between the integrator and the driving device, and the output signal from the integrator is inputted to one input terminal of the differential amplifier, and the output signal from the integrator is inputted to the other input terminal through a sampling/holding circuit. When the vibration isolation is OFF, the sampling/holding circuit samples the output signal from the integrator to make the value of the signal outputted from the differential amplifier to the driving device zero in order to hold the correcting at the specific position. When the vibration isolation is ON, the sampling/holding circuit holds the output signal from the integrator to set the output signal from the integrator as a reference, and the change of the output signal from the integrator with respect to the reference is outputted from the differential amplifier to the driving device. Thus, even when the vibration isolation is turned ON, the signal inputted to the driving signal is not discontinuous in order to prevent an image gap.

Japanese Patent Provisional Publication No. 11-284900, which corresponds to pending U.S. patent application Ser. No. 09/277,772 assigned to the assignee of the present application, discloses a vibration isolator that is provided on a lens supporter for attaching a lens device to a camera body. In the vibration isolator, a vibration determining device (an angular speed sensor or an acceleration sensor) is directly arranged in the camera body or a lens barrel.

In the method disclosed in Japanese Patent Provisional Publication No. 6-118469, the vibration speed sensor determines the vibration applied to the camera, and the position of the correcting lens for preventing the image blur is found according to the output from the sensor. However, there is a question on how the correcting lens is controlled with the center of the operation range at the origin.

The position of the correcting lens for preventing the image blur is the integrated value of the output signal from the sensor, and the position is controlled so that the correcting lens is at the origin when the integrated value is zero. However, the integrated value varies according to the starting point of the integration, and when the integrated value is zero varies according to the starting point. As a result, the operation range of the correcting lens changes according to the starting point. Thus, the center of the operation range is not always the origin. The center can be largely displaced from the origin, and the operation range is restricted by a mechanical end, and therefore the vibration isolator's full ability is not realized. The center of the operating range is preferably the origin so that the vibration isolator's full ability is realized. However, Japanese Patent Provisional Publication No. 6-118469 does not explain how the correcting lens is controlled with the center of the operation range at the origin.

If the output signal from the sensor includes noise components or drift components, the components are accumulated in the integrated value of the output signal. In this case, even if the center of the operation range is the origin at the beginning, the center is gradually displaced from the origin and the vibration isolator's full ability is not realized.

In the vibration isolator disclosed in Japanese Patent No. 2918537, when the vibration isolation is ON, the output signal from the integrator is set as the reference, and the change of the output signal from the integrator with respect to the reference is outputted from the differential amplifier to the driving device in order to prevent the image gap. Thus, the oscillation center of the correcting lens is displaced from the origin (center of the range in which the correcting lens can move). The oscillation range is restricted within the range in which the correcting lens can move. If the center of the operation range is displaced from the origin, the maximum oscillation gets smaller, and the vibration isolator can not appropriately prevent the image blur when the vibration of the camera is large. In short, the vibration isolation is deteriorated to prevent the image gap.

If the vibration isolation is started when a predetermined switch (a shutter release button in Japanese Patent No. 2918537) is operated, the vibration isolation is unstable because of a vibration caused by the operation of the switch, and it further blurs the image.

The above problem is caused because the vibration isolator tries to completely prevent the image blur when the switch is operated. However, the image blur does not have to be prevented when the switch is operated in an apparatus such as the lens device for the TV camera and a still camera.

In the vibration isolator disclosed in Japanese Patent Provisional Publication No. 11-284900, the vibration determining device is directly arranged in the camera body or the like. The vibration determining device determines a vibration caused by the movement of the correcting lens, and the vibration caused by the movement of the correcting lens does not cause the image blur. Thus, the vibration isolation is deteriorated.

SUMMARY OF THE INVENTION

In view of the foregoing, it is an object of the present invention to provide a vibration isolator which can appropriately set a center of an operation range of a correcting lens at a center (origin) of a range in which the correcting lens can move and eliminate an unwanted influence caused by noise components in an output signal from a vibration speed sensor and appropriately prevent an image blur.

In view of the foregoing, it is an object of the present invention to provide a vibration isolator which can prevent an image gap without deteriorating vibration isolation when the vibration isolation is turned off.

In view of the foregoing, it is an object of the present invention to provide a vibration isolator which can determine only a vibration that causes an image blur and appropriately prevent the image blur.

To achieve the above-mentioned object, the present invention is directed to a vibration isolator that prevents an image blur due to a vibration of a camera by moving a correcting optical system, the vibration isolator comprising: a vibration speed determining device that determines a speed of the vibration; a differentiating device that differentiates the speed determined by the vibration speed determining device; an integrating device that integrates the speed determined by the vibration speed determining device; a correcting device that corrects the integrated value calculated by the integrating device to substantially zero when the differentiated value calculated by the differentiating device is substantially zero; and a controlling device that controls a position of the correcting optical system according to the integrated value.

According to the present invention, the vibration isolator determines the speed of the vibration applied to the camera, and differentiates and integrates the speed, and corrects the integrated value to substantially zero when the differentiated value is substantially zero, and determines the position of the correcting optical system according to the integrated value. Thus, the oscillation center of the correcting optical system is set at the origin, and the unwanted influence due to the noise components in the output signal from the vibration determining device can be eliminated.

To achieve the above-mentioned object, the present invention is directed to a vibration isolator that prevents an image blur by moving a vibration isolating device according to a vibration of an apparatus determined by a vibration determining device, the vibration isolator comprising: a switching device that turns on and off vibration isolation; and a controlling device that keeps the vibration isolating device at a position until a predetermined time passes after the switching device turns on the vibration isolation and moves the vibration isolating device according to the vibration after the predetermined time passes.

To achieve the above-mentioned object, the present invention is directed to a vibration isolator that prevents an image blur by moving a vibration isolating device according to a vibration of an apparatus determined by a vibration determining device, the vibration isolator comprising: a switching device that turns on and off vibration isolation; and a controlling device that keeps the vibration isolating device at an origin until a position of the vibration isolating device for preventing the image blur is the origin after the switching device turns on the vibration isolation and moves the vibration isolating device according to the vibration after the position of the vibration isolating device for preventing the image blur is the origin.

To achieve the above-mentioned object, the present invention is directed to a vibration isolator that prevents an image blur by moving a vibration isolating device according to a vibration of an apparatus determined by a vibration determining device, the vibration isolator comprising: a switching device that turns on and off vibration isolation; and a controlling device that starts moving the vibration isolating device with a driving amount that is smaller than that for preventing the image blur when the switching device turns on the vibration isolation and drives the vibration isolating device while gradually increasing the driving amount to that for preventing the image blur.

The controlling device stops the vibration isolating device at a position when the switching device turns off the vibration isolation.

The controlling device gradually decreases a driving amount of the vibration isolating device to stop the vibration isolating device at a position after the switching device turns off the vibration isolation.

The controlling device does not calculate a driving signal for driving the vibration isolating device when the vibration isolation is off and starts calculating the driving signal after the switching device turns on the vibration isolation.

As set forth hereinabove, according to the present invention, the vibration isolator starts the vibration isolation the predetermined time after the switching device turns on the vibration isolation. Thus, the vibration caused by the operation of the switching device can be canceled, and the image gap can be prevented when the switching device turns on the vibration isolation.

After the switching device turns on the vibration isolation, the vibration isolation is not started until the vibration isolating device comes to the origin. Thus, the vibration isolator can prevent the image gap without changing the oscillation center of the vibration isolating device from the origin. Therefore, the image gap can be prevented when the switching device turns on the vibration isolation while the vibration isolation is not deteriorated.

After the switching device turns on the vibration isolation, the driving amount of the vibration isolating device is gradually increased and then the vibration isolation is started. Thus, the vibration isolator can prevent the image gap without changing the oscillation center of the vibration isolating device from the origin. Therefore, the image gap can be prevented when the switching device turns on the vibration isolation while the vibration isolation is not deteriorated.

After the switching device turns off the vibration isolation, the driving amount of the vibration isolating device is gradually decreased and then the vibration isolating device is stopped at the origin. Thus, the image gap can be prevented when the switching device turns off the vibration isolation.

The vibration isolator starts calculating the driving signal after the switching device turns on the vibration isolation to save electricity. If the CPU calculates the driving signal, it can be efficiently used for another processing while the vibration isolation is off.

To achieve the above-mentioned object, the present invention is directed to a vibration isolator that determines a vibration of a camera with a determining device and moves a correcting optical system according to the vibration to prevent an image blur due to the vibration of the camera, wherein: the determining device is attached to the camera through a vibration absorbing device that absorbs a vibration due to a movement of the correcting optical system.

According to the present invention, the vibration absorbing device absorbs the vibration due to the movement of the correcting optical system, and thus the vibration that does not cause the image blur is not transmitted to the determining device. Therefore, the determining device can determine only the vibration that causes the image blur to appropriately prevent the image blur.

To achieve the above-mentioned object, the present invention is directed to a vibration isolator that determines a vibration of a camera with a determining device and moves a correcting optical system according to the vibration to prevent an image blur due to the vibration of the camera, wherein: the determining device is provided separately from the camera.

According to the present invention, even if the correcting optical system is vibrated, the vibration is not transmitted to the determining device that is separate from the camera. Therefore, the determining device can determine only the vibration that causes the image blur to appropriately prevent the image blur.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 3(A), 3(B) and 3(C) are graph diagrams showing an angular speed of a vibration, a differentiated value of the angular speed and an integrated value of the angular speed, respectively;

FIG. 4 is a flow chart showing the processing of the CPU;

FIG. 6 is a graph diagram showing a first embodiment of the vibration isolation when a switch is turned ON;

FIG. 7 is a graph diagram showing a second embodiment of the vibration isolation when the switch is turned ON;

FIG. 8 is a graph diagram showing a third embodiment of the vibration isolation when the switch is turned ON;

FIG. 9 is a graph diagram showing an embodiment of the vibration isolation when the switch is turned OFF;

DETAILED DESCRIPTION OF THE PREFERRED EMBODIMENT

This invention will be described in further detail by way of example with reference to the accompanying drawings.

Figure 1:
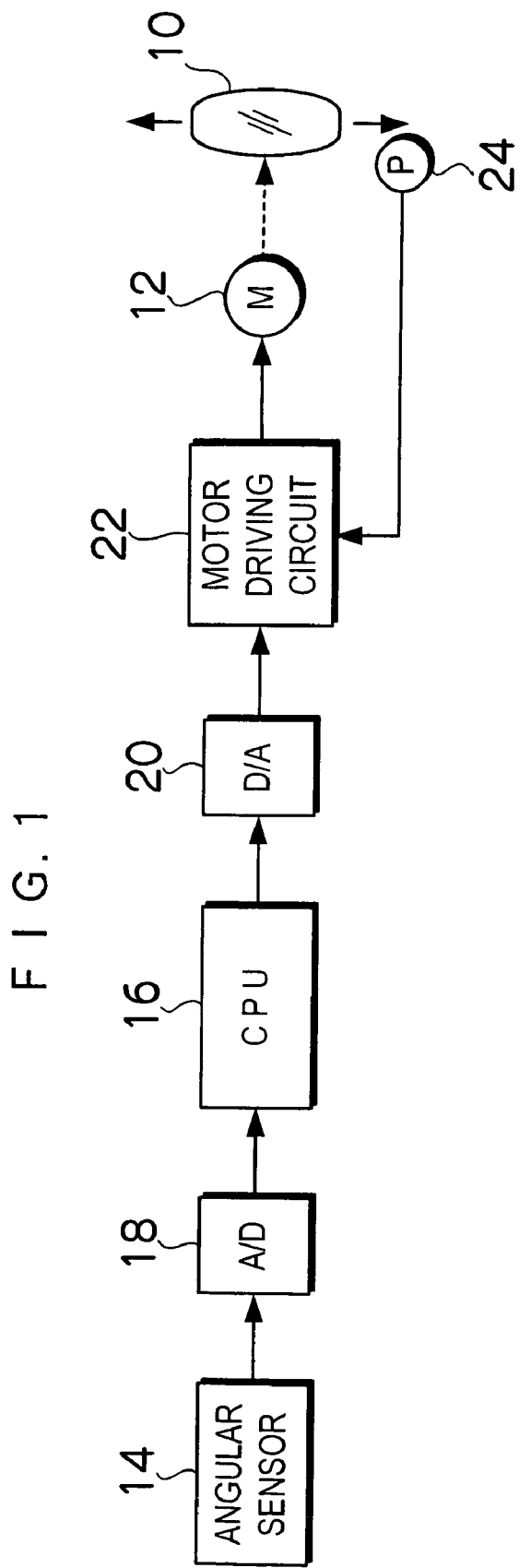
FIG. 1 is a block diagram showing an embodiment of a vibration isolator according to the present invention.

FIG. 1 is a block diagram showing an embodiment of a vibration isolator according to the present invention. The vibration isolator is provided in a lens device for a TV camera, an animation camera, a still camera, or the like. A correcting lens 10 is provided in a lens barrel of the lens device or the camera in such a manner as to move vertically and horizontally. When the camera (lens barrel) is vibrated, a motor 12 moves the correcting lens 10 to such a position as to prevent an image blur (cancel the vibration). Though the vibration isolator has two motors that move the correcting lens 10 vertically and horizontally within a plane that is perpendicular to an optical axis, only the motor 12 that moves the correcting lens 10 vertically or horizontally is shown in FIG. 1 and the other motor will not be explained in the embodiment.

Angular speed sensors 14 in FIG. 1 are used as vibration speed sensors for determining vibration speeds of the lens barrel to determine vibration angular speeds as the vibration speeds. Speed sensors may be used instead of the angular speed sensors 14. The angular speed sensors 14 are provided on the top and the side of the lens barrel to determine the angular speed of the vertical vibration and the angular speed of the horizontal vibration and output electric signals corresponding to the determined angular speeds. FIG. 1 shows only the angular speed sensor 14 that determines the angular speed of the vibration whose direction is the same as the direction in which the motor 12 moves the correcting lens 10.

A CPU 16 in FIG. 1 acquires the electric signal outputted from the angular speed sensor 14 through an A/D converter 18 to obtain the angular speed of the vibration applied to the lens barrel. Then, the CPU 16 determines a position of the correcting lens 10 for preventing the image blur according to the angular speed, and outputs a position signal to a motor driving circuit 22 through a D/A converter 20 for moving the correcting lens 10 to the position.

The motor driving circuit 22 drives the motor 12 according to the position signal inputted from the CPU 16 while determining a position of the correcting lens 10 with a potentiometer to move the correcting lens 10 to the position for preventing the image blur.

Figure 2:
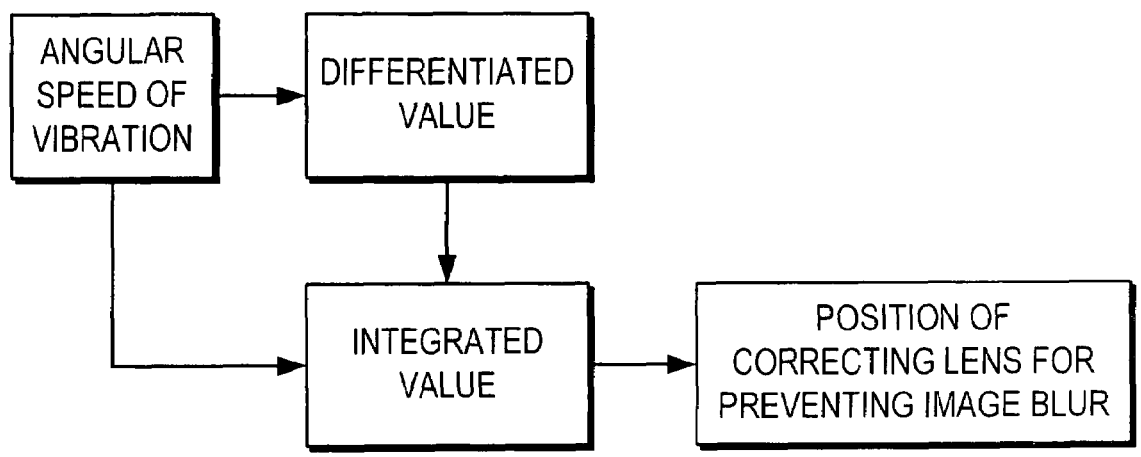
FIG. 2 is an explanatory diagram showing a processing of a CPU.

The processing of the CPU 16 will now be explained. As shown in FIG. 2, the CPU 16 differentiates and integrates the angular speed of the vibration obtained from the angular speed sensor 14, and corrects the integrated value according to the differentiated value to determine the position of the correcting lens 10 for preventing the image blur.

In the differentiation, the CPU 16 differentiates the angular speed ω with respect to time t. An increment Δω of the angular speed ω obtained at time intervals Δt may be calculated. In the integration, the CPU 16 integrates the angular speed c with respect to time t. A total of the angular speed ω obtained at the time intervals Δt may be calculated.

Suppose the angular speed ω of the vibration is shown by the following equation 1 as shown in FIG. 3(A), $$\omega = A \sin Bt \qquad \text{equation 1,}$$

wherein A and B are constants and t is the time.

The differentiated value dω/dt is shown by the following equation 2 as shown in FIG. 3(B), $$d\omega/dt = AB \cos Bt \qquad \text{equation 2,}$$

and the differentiated value dω/dt is zero when the angular speed ω is the maximum or the minimum (t1, t3, t5, . . . ).

The integrated value ∫ωdt with the area from a starting point tx through the time t is shown by the following equation 3, ∫ωdt=−(A/B)cos Bt+(A/B)cos Btx          equation 3, and the integrated value ∫ωdt oscillates with the second term of the right member of the equation 3 at its center. If the second term is zero, the integrated value ∫ωdt oscillates with zero at its center as shown in FIG. 3(C).

The integrated value of the angular speed is the position (displacement from the origin) of the correcting lens 10 for preventing the image blur (a product of the integrated value and a predetermined value may be the position), and the first term of the right member of the equation 3 indicates the oscillation of the correcting lens 10 for preventing the image blur and the second term indicates the center (oscillation center) of the moving range of the correcting lens 10. The starting point tx need to be appropriately set since the second term is preferably zero (the oscillation center is preferably the origin). The starting point tx for making the second term zero is understood if the constant B is known, but the constant B varies according to the vibration applied to the lens barrel. The constant B may be determined from the period of the angular speed ω, but it can not be determined until at least half the period passes. However, the starting point tx for making the second term zero can be easily understood from the differentiated value of the equation 2.

When the differentiated value is zero, cos Bt is zero; and the second term is zero if the starting point tx is set at the time when the differentiated value is zero. Actually, the integration is started at an arbitrary time, and the integrated value is corrected to zero to set the starting point tx for making the oscillation center the origin as shown in FIG. 3(C) when the differentiated value is zero.

As described above, the CPU 16 differentiates and integrates the angular speed, and corrects the integrated value to zero when the differentiated value is zero, and determines the position of the correcting lens 10 for preventing the image blur at the corrected integrated value. Thus, the oscillation center of the correcting lens 10 is set at the origin, and the operating range of the correcting lens 10 is the maximum without being restricted by a mechanical end. Therefore, the vibration isolator's full ability is realized. Since the differentiated value of the angular speed is an angular acceleration, the vibration isolator may use an angular acceleration sensor instead of differentiating the angular speed. But, the vibration isolator does not need the angular acceleration sensor by differentiating the angular speed in order to lower its cost.

If the signals outputted from the angular speed sensor 14 has noise components or drift components, the components are accumulated in the integrated value. Even if the oscillation center of the correcting lens 10 is set at the origin at the beginning, the oscillation center is gradually displaced from the origin. The oscillation center is also gradually displaced from the origin if the period of the vibration changes. To address this problem, every time the differentiated value is zero, the CPU 16 corrects the integrated value to zero to eliminate the displacement due to the components and the change of the vibration. But, the CPU 16 does not have to correct the integrated value every time the differentiated value is zero, and it may correct the integrated value only if the displacement is more than a predetermined value when the differentiated value is zero. Also, the CPU 16 may correct the integrated value only if the oscillation center is displaced from the origin so much that the oscillation range of the correcting lens 10 is restricted by the mechanical end and the image blur is not appropriately prevented. In addition, the CPU 16 may gradually correct the integrated value so that the correction does not affect the image instead of correcting the integrated value to zero at one time. As described above, the CPU 16 corrects the integrated value to zero to eliminate the displacement due to the components and the change of the vibration. The CPU 16 can correct the integrated value to substantially zero when the differentiated value is substantially zero.

FIG. 4 is a flow chart showing the processing of the CPU 16. The CPU 16 obtains the angular speed of the vibration at the predetermined time intervals from the angular speed sensor 14 (step 10). Then, the CPU 16 differentiates and integrates the obtained angular speed (steps 12 and 14). Next, the CPU 16 determines whether or not the differentiated value is zero (step 16). If yes, the CPU 16 corrects the integrated value to zero (step 18). If no, the CPU 16 does not correct the integrated value. The CPU 16 repeats the processing to output the position signal indicating the position for preventing the image blur to the motor driving circuit 22 according to the integrated value.

The angular speed sensor 14 is used as the vibration speed sensor for determining the vibration speed, but the speed sensor may be used instead of the angular speed sensor 14. In this case, the processing of the CPU 16 is the same as that described above.

The vibration isolator prevents the image blur with the correcting lens provided in the lens barrel in the embodiment, but the present invention can be applied to any vibration isolator that prevents the image blur by driving a correcting optical system.

Figure 5:
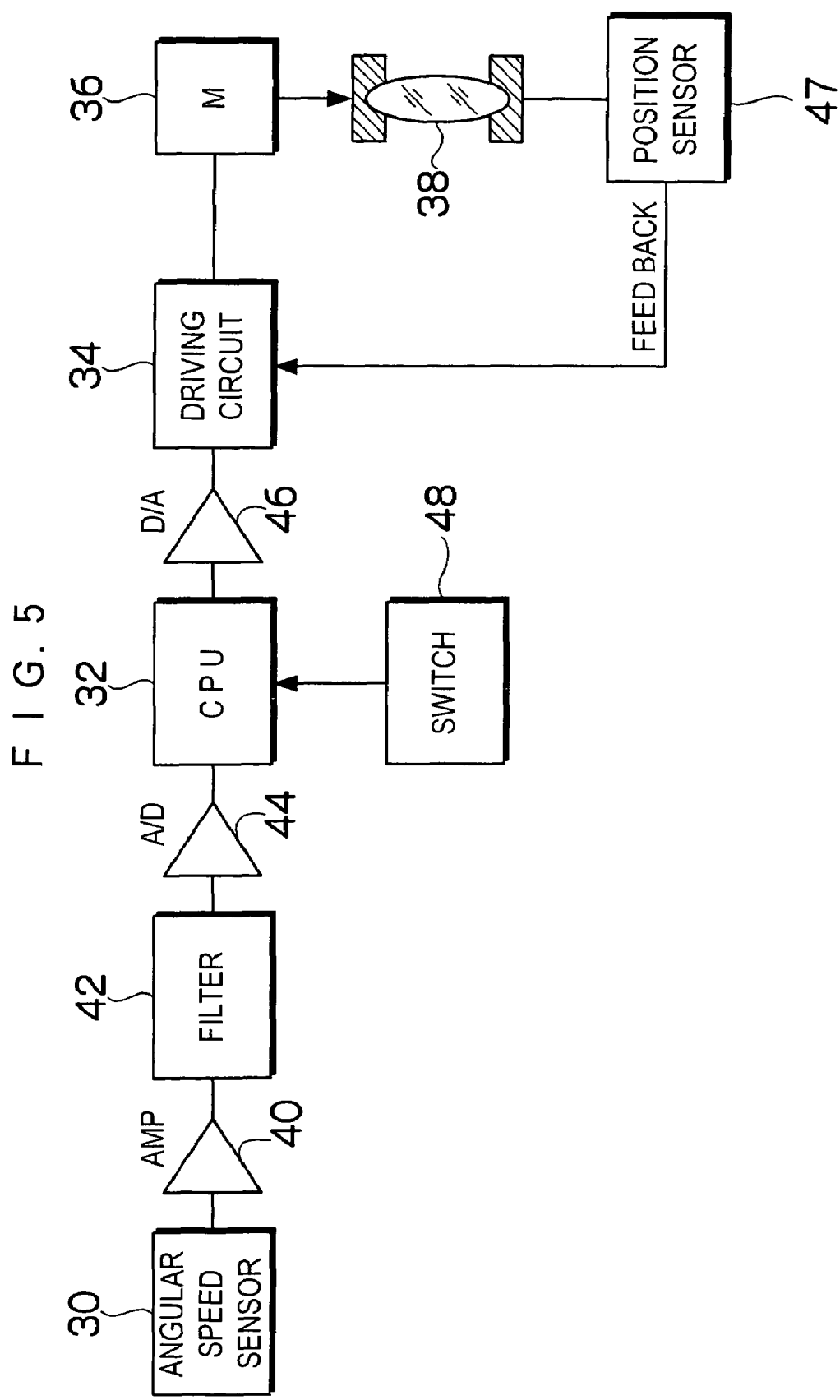
FIG. 5 is a block diagram showing another embodiment of the vibration isolator according to the present invention.

FIG. 5 is a block diagram showing another embodiment of the vibration isolator according to the present invention. The vibration isolator is applied to a lens device for a TV camera, and it prevents an image blur by moving a correcting lens 38 provided in an optical system of the lens device within a plane that is perpendicular to an optical axis according to a vibration applied to the TV camera. In the embodiment, the vibration isolator only moves the correcting lens 38 vertically to cancel only a vertical vibration in order to make the explanation easy. The vibration isolator can cancel a horizontal vibration in the same way.

As shown in FIG. 5, the vibration isolator comprises an angular speed sensor 30, a CPU 32, a driving circuit 34, a motor 36 and the correcting lens 38. The angular speed sensor 30 is provided in the lens device for the TV camera or the camera body to determine the vibration applied to the TV camera. Information (an analog signal) on the vibration determined by the angular speed sensor 30 is amplified by an amplifier 40, and high-frequency components of the amplified signal is cut off by a low-pass filter 42. Then, the signal is outputted to the CPU 32 through an A/D converter 44. The CPU 32 once-integrates the signal inputted from the angular speed sensor 30 to find a position of the correcting lens 38 for preventing the image blur with respect to an origin of the correcting lens 38.

An angular acceleration sensor may be used instead of the angular speed sensor 30, and the CPU 32 calculates the position of the correcting lens 38 for preventing the image blur by twice-integrating a signal inputted from the angular acceleration sensor in this case. Another calculation may be performed in addition to the integration to find the position. For example, if the oscillation center of the correcting lens 38 is displaced from the origin, a calculation for returning the oscillation center to the origin is performed. But, the calculation is omitted in the embodiment, where the CPU 32 once-integrates the signal inputted from the angular speed sensor 30 to find the position and the oscillation center of the correcting lens 38 is substantially the same as the origin.

The CPU 32 outputs a signal (driving signal) indicating the calculated position of the correcting signal 38 for preventing the image blur to the driving circuit 34 through a D/A converter 46. The driving circuit 34 drives the motor 36 according to the driving signal to move the correcting lens 38 in such a direction as to prevent the image blur. A position of the correcting lens 38 is fed back to the driving circuit 34 by a position sensor 47 so that the driving circuit 34 can appropriately move the correcting lens 38 to the position for preventing the image blur.

A switch 48 can be turned ON and OFF. When the switch 48 is ON, the vibration isolation with the correcting lens 38 is performed; and when the switch 48 is OFF, the vibration isolation is not performed. The CPU 32 determines whether the switch 48 is ON or OFF, and performs the following processing according to whether the switch 48 is ON or OFF. The switch 48 is provided in the lens device, the camera body or the like.

When the switch 48 is OFF, the CPU 32 does not output the driving signal to the driving circuit 34 (the value of the driving signal is zero) to keep the correcting lens 38 at the origin, and thus the vibration isolation is not performed. In this case, the CPU 32 may calculate the value of the driving signal, and it may not calculate that. Even if the CPU 32 calculates the value of the driving signal when the switch 48 is OFF, the CPU 32 does not output the driving signal to the driving circuit 34.

If the CPU 32 does not calculate the value of the driving signal when the switch 48 is OFF, the CPU 32 may be set in a sleep mode. In the sleep mode, the CPU 32 does not receive the signal outputted from the angular speed sensor 30, and does not calculate the value of the driving signal, and does not output the driving signal to the driving circuit 34 while waiting for the switch 48 to be turned ON. In this case, the electricity can be saved when the switch 48 is OFF.

The angular speed sensor 30, the amplifier 40, the A/D converter 44, the low pass filter 42 and the like may be stopped to further save electricity when the switch 48 is OFF. The CPU 32 calculates the value of the driving signal in the embodiment, but an analog circuit such as an integrating circuit may do that instead of the CPU 32. In this case, the analog circuit can be stopped to save electricity when the switch 48 is OFF.

In addition, the CPU 32 does not necessarily stop the correcting lens 38 at the origin, and the CPU 32 may output a driving signal with a predetermined value to the driving circuit to stop the correcting lens 38 at a predetermined position.

If the CPU 32 performs another processing while calculating the value of the driving signal, the CPU 32 only performs the processing without being set in the sleep mode when the switch 48 is OFF. Thus, the CPU 32 can be efficiently used without calculating the value of the driving signal when the switch 48 is OFF.

Figure 6:
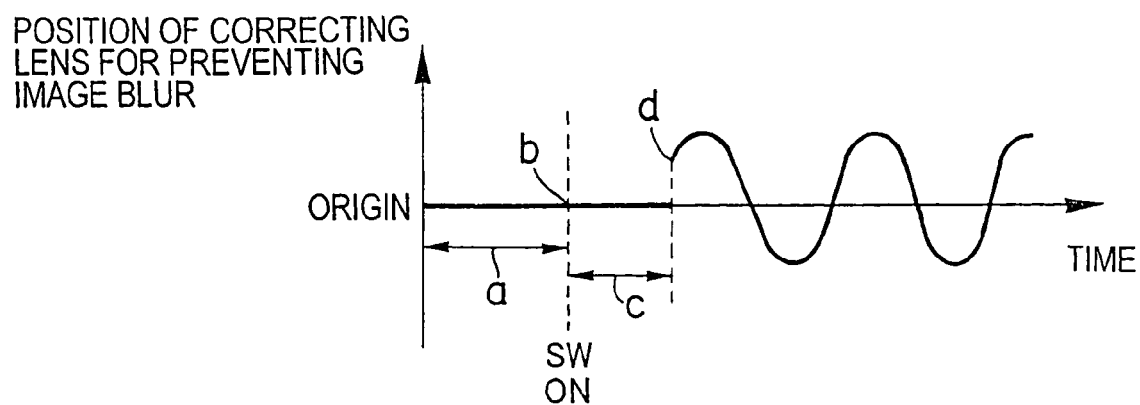

The case in which the switch 48 is turned ON will now be explained. The CPU 32 does not calculate the value of the driving signal when the switch 48 is OFF in the following embodiments. FIG. 6 is a graph diagram showing the first embodiment of the vibration isolation when the switch 48 is turned ON. The correcting lens 38 is at the origin during a period a when the switch 48 is OFF, and the switch 48 is turned ON at a time point b. Then, the CPU 32 starts receiving the signal from the angular speed sensor 30 and calculating the value of the driving signal. The CPU 32 does not output the driving signal to the driving circuit 34 during a period c after the switch 48 is turned ON. Thus, the correcting lens 38 is kept at the origin during the period c.

When a predetermined time (the period c) has passed after the switch 48 is turned ON, the CPU 32 starts outputting the driving signal to the driving circuit 34 to drive the correcting lens 38 in order to start the vibration isolation. The CPU 32 continues the vibration isolation until the switch 48 is turned OFF.

As described above, the CPU 32 starts the vibration isolation when the predetermined time has passed after the switch 48 is turned ON, and thus a vibration which occurs when the switch 48 is turned ON and an unstable driving signal just after the start of the calculation can be canceled. A processing for stabilizing the driving signal may be performed during the period c. This prevents the image blur when the switch 48 is turned ON. The CPU 32 starts calculating the value of the driving signal when the switch 48 is turned ON, but the CPU 32 only needs to start the calculation before starting driving the correcting lens 38. The predetermined time (the period c) is preferably 0.2 second or so.

Figure 7:
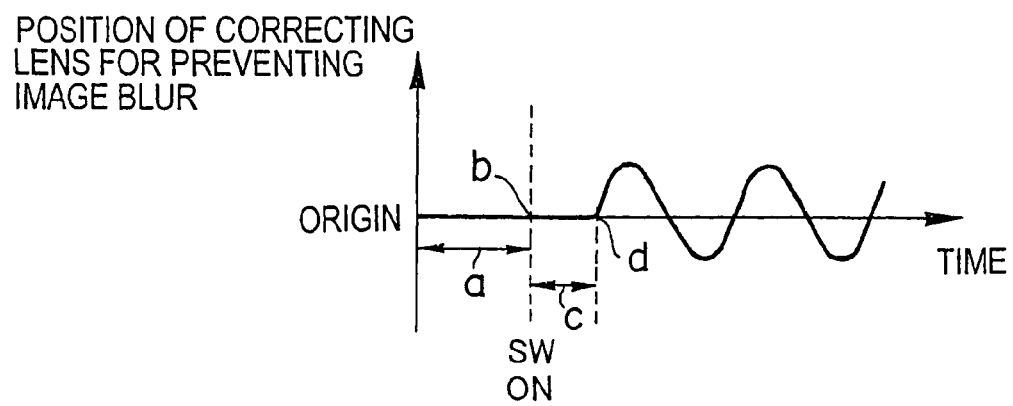

FIG. 7 is a graph diagram showing the second embodiment of the vibration isolation when the switch 48 is turned ON. The second embodiment is different from the first embodiment in that the CPU 32 starts the vibration isolation when the value of the driving signal becomes zero.

The correcting lens 38 is at the origin during a period a when the switch 48 is OFF, and the switch 48 is turned ON at a time point b. Then, the CPU 32 starts receiving the signal from the angular speed sensor 30 and calculating the value of the driving signal. But, the CPU 32 does not output the driving signal to the driving circuit 34 until the value of the driving signal becomes zero at a time point d. Thus, the correcting lens 38 is kept at the origin until the value of the driving signal becomes zero. A period c between the time points b and d is changed according to the conditions, unlike the period c in the first embodiment.

At the time point d, the CPU 32 starts outputting the driving signal to the driving circuit 34 to drive the correcting lens 38 in order to start the vibration isolation. The CPU 32 continues the vibration isolation until the switch 48 is turned OFF.

As described above, the CPU 32 starts the vibration isolation when the value of the driving signal becomes zero after the switch 48 is turned ON, and thus an image gap at the start of the vibration isolation can be prevented. Since the CPU 32 does not correct the driving signal to prevent the image gap, the oscillation center of the correcting lens 38 can be substantially the origin and the vibration isolation is never deteriorated. In addition, a problem caused by a vibration that occurs when the switch 48 is turned ON can be prevented.

FIG. 8 is a graph diagram showing the third embodiment of the vibration isolation when the switch 48 is turned ON. The correcting lens 38 is at the origin during a period a when the switch 48 is OFF, and the switch 48 is turned ON at a time point b. Then, the CPU 32 starts receiving the signal from the angular speed sensor 30 and calculating the value of the driving signal. During a period c after the time point b, the CPU 32 does not output the driving signal itself but a driving signal with a reduced value. The value of the outputted driving signal is gradually raised during a period c. The value of the driving signal at the time point b is zero, and the value of the driving signal at a time point d is the calculated value for preventing the image blur. After the time point d, the CPU 32 outputs the calculated driving signal for preventing the image blur to the driving circuit until the switch 48 is turned OFF.

Thus, an image gap at the start of the vibration isolation can be prevented in the same way as in the second embodiment. Since the CPU 32 does not correct the driving signal to prevent the image gap, the oscillation center of the correcting lens 38 can be substantially the origin and the vibration isolation is never deteriorated. In addition, a problem caused by a vibration that occurs when the switch 48 is turned ON can be prevented since the oscillation is small during the period c.

The value of the driving signal at the time point b is not necessarily zero, and it only needs to be smaller than the calculated value for preventing the image blur. The period c is preferably from 0.3 to 0.5 second.

The case in which the switch 48 is turned OFF will now be explained. The CPU 32 may output the driving signal with the value of zero to the driving circuit 34 to return the correcting lens 38 to the origin when the switch 48 is turned OFF. But, the CPU 32 may return the correcting lens 38 to the origin in the following method.

As shown in FIG. 9, the CPU 32 outputs the calculated driving signal for preventing the image blur to the driving circuit 34 during a period a when the switch 48 is ON, and the switch 48 is turned OFF at a time point b. The CPU 32 calculates the value of the driving signal even during a period c after the time point b and outputs a driving signal with a reduced value. The value of the outputted driving signal is gradually lowered during the period c. The value of the driving signal at the time point b is the calculated value for preventing the image blur, and the value of the driving signal at a time point d is zero. After the time point d, the CPU 32 outputs the driving signal with the value of zero to stop the vibration isolation until the switch 48 is turned ON.

Thus, the correcting lens 38 stops at the origin without causing an image gap when the switch 48 is turned OFF.

The vibration isolator of the TV lens device is explained in the embodiment, but the present invention may be applied to a vibration isolator of any apparatus.

Figure 10:
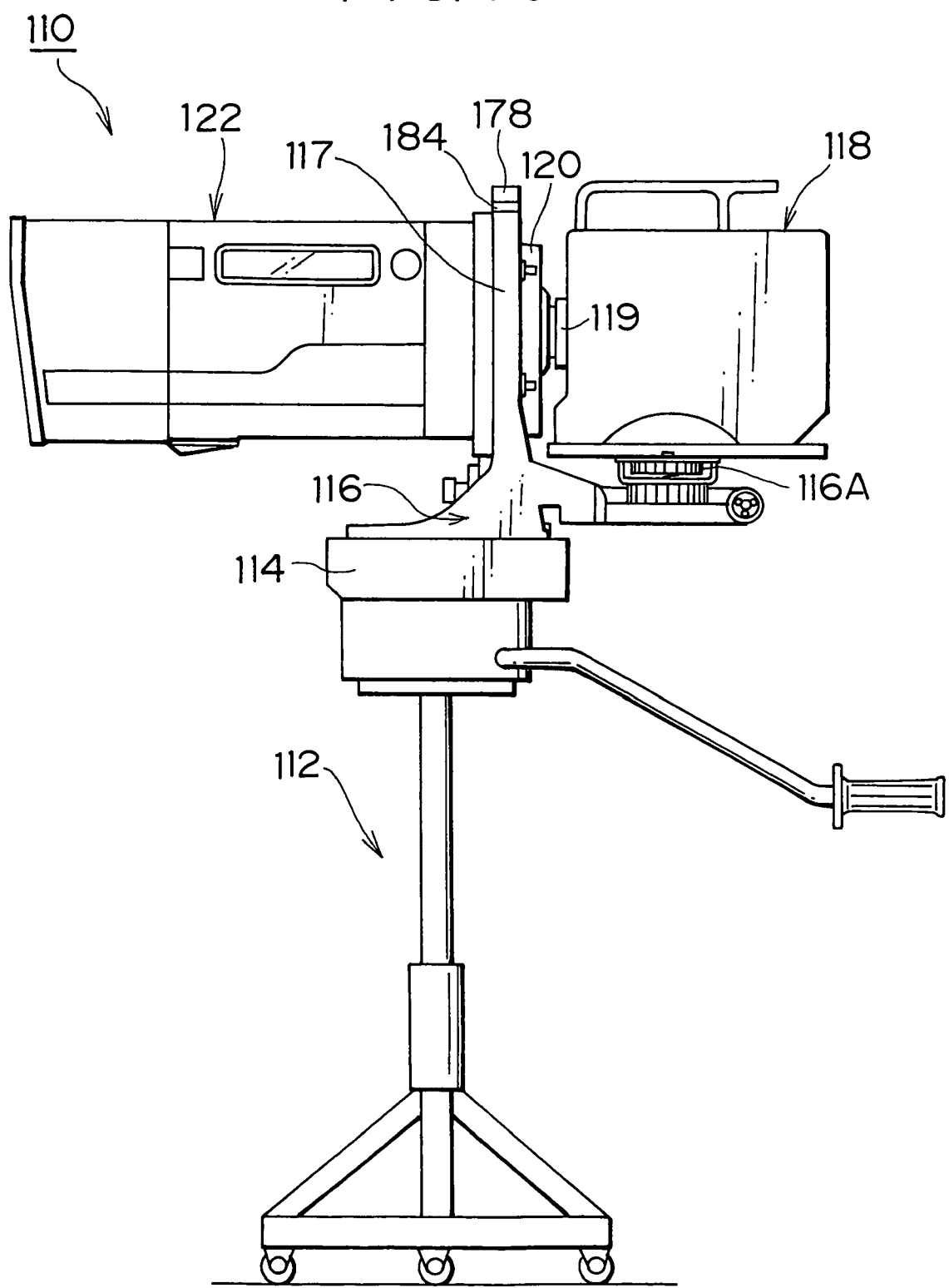
FIG. 10 is a view showing the whole studio camera unit to which a vibration isolator of a first embodiment is applied.

FIG. 10 shows a studio camera unit 110 to which a vibration isolator 120 according to the first embodiment of the present invention is applied.

As shown in FIG. 10, the studio camera unit 110 is constructed in such a way that a screen-shaped lens supporter 116 is fixed to a tripod head 114 of a tripod 112 and an ENG camera (hereafter referred to as a camera) 118 is supported at the right side of a mount frame 117 of the lens supporter 116 through the vibration isolator 120. An EFP lens device 122 is supported at the left side of the mount frame 117 in FIG. 10. Reference numeral 116A in FIG. 10 indicates a height adjustment knob for adjusting the height of the camera 118.

A lens mount 123 at the back end of the lens device 122 is arranged through an opening 117A formed in the mount frame 117 of the lens supporter 116. The lens mount 123 is inserted into a ring 121A provided at the left side of the vibration isolator 120 in FIG. 11. A mount 121B is provided at the right side of the vibration isolator 120 in FIG. 11, and a mount 119 of the camera 118 connects to the mount 121B. Consequently, the camera 118 and the lens device 122 are supported by the lens supporter 116 and the vibration isolator 120 in the state wherein the optical axes of the camera 118 and the lens device 122 correspond to one another.

A tapped hole is formed in a boss 128, which projects horizontally from the back face of the mount frame 117 of the lens supporter 116. The boss 128 is inserted into a casing 130 formed in the vibration isolator 120, and a screw 132 is screwed into the tapped hole. Consequently, the vibration isolator 120 is positioned and attached to the lens supporter 116.

Figure 12:
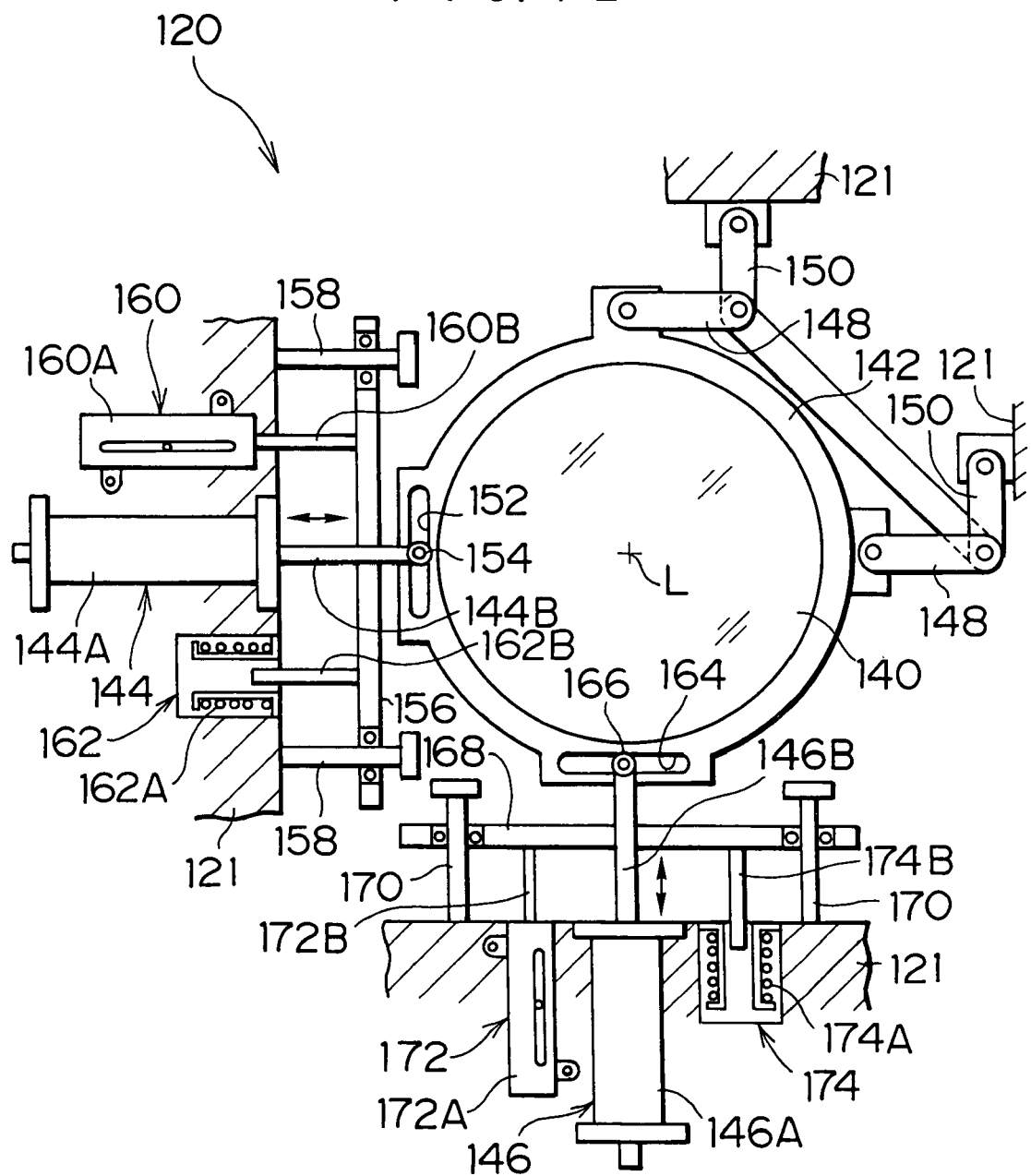
FIG. 12 is a view showing the structure for supporting a correcting lens built in the vibration isolator.

FIG. 12 is a front view showing the structure for supporting a correcting lens 140 built in the vibration isolator 120. As shown in FIG. 12, the correcting lens 140 is held on a lens frame 142 and is arranged in a body 121 of the vibration isolator 120. Linear motors 144, 146 move the correcting lens 140 in a direction to correct the blur of an image on a plane perpendicular to an optical axis L. The correcting lens 140 is movably supported at the body 121 through a parallel link mechanism composed of four arms 148, 150.

The linear motor 144 moves the correcting lens 140 horizontally, and it is composed of a motor body 144A and a rod 144B. The motor body 144A is fixed to the body 121, and the end of the rod 144B is inserted into a slot 152 of the lens frame 142 through a roller. The slot 152 is vertically formed at the left side of the lens frame 142, and the roller 154 is vertically movable relative to the slot 152. When the driving force of the motor body 144A extends and contracts the rod 144B, the rod 144B presses or pulls the correcting lens 140 horizontally.

A connecting frame 156 connects to the rod 144B of the linear motor 144. The connecting frame 156 extends vertically, and the rod 144B is secured to the center of the connecting frame 156. The top and bottom ends of the connecting frame 156 are slidably supported on linear guides 158, which are parallel with the rod 144B. With the extension and contraction of the rod 144B, the connecting frame 156 moves horizontally with its position being maintained.

The end of a detecting contact needle 160B of a position sensor 160 is pressed against the connecting frame 156. A sensor body 160A of the position sensor 160 is fixed to the body 121 so that the detecting contact needle 160B can be parallel to the rod 144B. The position sensor 160 detects the moving amount of the connecting frame 156, which moves parallel in accordance with the extension and contraction of the rod 144B.

According to the position sensor 160, the detecting contact needle 160B is not in contact with the peripheral surface of the lens frame 142, but in contact with the connecting frame 156 so as to indirectly detect the moving length of the correcting lens 140. As stated previously, the connecting frame 156 moves parallel with its position being maintained regardless of the extending and contracting amount of the rod 144B. For this reason, the detecting contact needle 160B does not slip off from the moving connecting frame 156.

Reference numeral 162A indicates a bobbin of a speed generator 162, and reference numeral 162B indicates a core of the speed generator 162. The core 162B is secured to the connecting frame 156.

On the other hand, the linear motor 146 moves the correcting lens 140 vertically, and it is composed of a motor body 146A and a rod 146B. The motor body 146A is fixed to the body 121, and the end of the rod 146B is inserted into a slot 164 of the lens frame 142 through a roller 166. The slot 164 is formed horizontally at the lower part of the lens frame 142, and the roller is movable horizontally relative to the slot 164. When the driving force of the motor body 146A extends and contracts the rod 146B, the rod 146B presses or pulls the lens frame 142 vertically.

A connecting frame 168 connects to the rod 146B of the linear motor 146. The connecting frame 156 extends horizontally, and the rod 146B is secured to the center of the connecting frame 156. The right and left ends of the connecting bar 168 are slidably supported on linear guides 170, which are parallel with the rod 146B. With the extension and contraction of the rod 146B, the connecting frame 168 moves vertically with its position being maintained.

The end of a detecting contact needle 172B of a position sensor 172 is pressed against the connecting frame 168. A sensor body 172A of the position sensor 172 is fixed to the body 121 so that the detecting contact needle 172B can be parallel to the rod 146B. The position sensor 172 detects the moving amount of the connecting frame 168, which moves parallel in accordance with the extension and contraction of the rod 146B.

According to the position sensor 172 of this embodiment, the detecting contact needle 172B is not in contact with the peripheral surface of the lens frame body 142, but in contact with the connecting frame 168 so as to indirectly detect the moving length of the correcting lens 140. As stated previously, the connecting frame 168 moves parallel with its position being maintained regardless of the extending and contracting amount of the rod 146B. For this reason, the detecting contact needle 172B does not slip off from the moving connecting frame 168.

Reference numeral 174A indicates a bobbin of a speed generator 174, and reference numeral 174B indicates a core of the speed generator 174. The core 174B is secured to the connecting frame 168.

Figure 13:
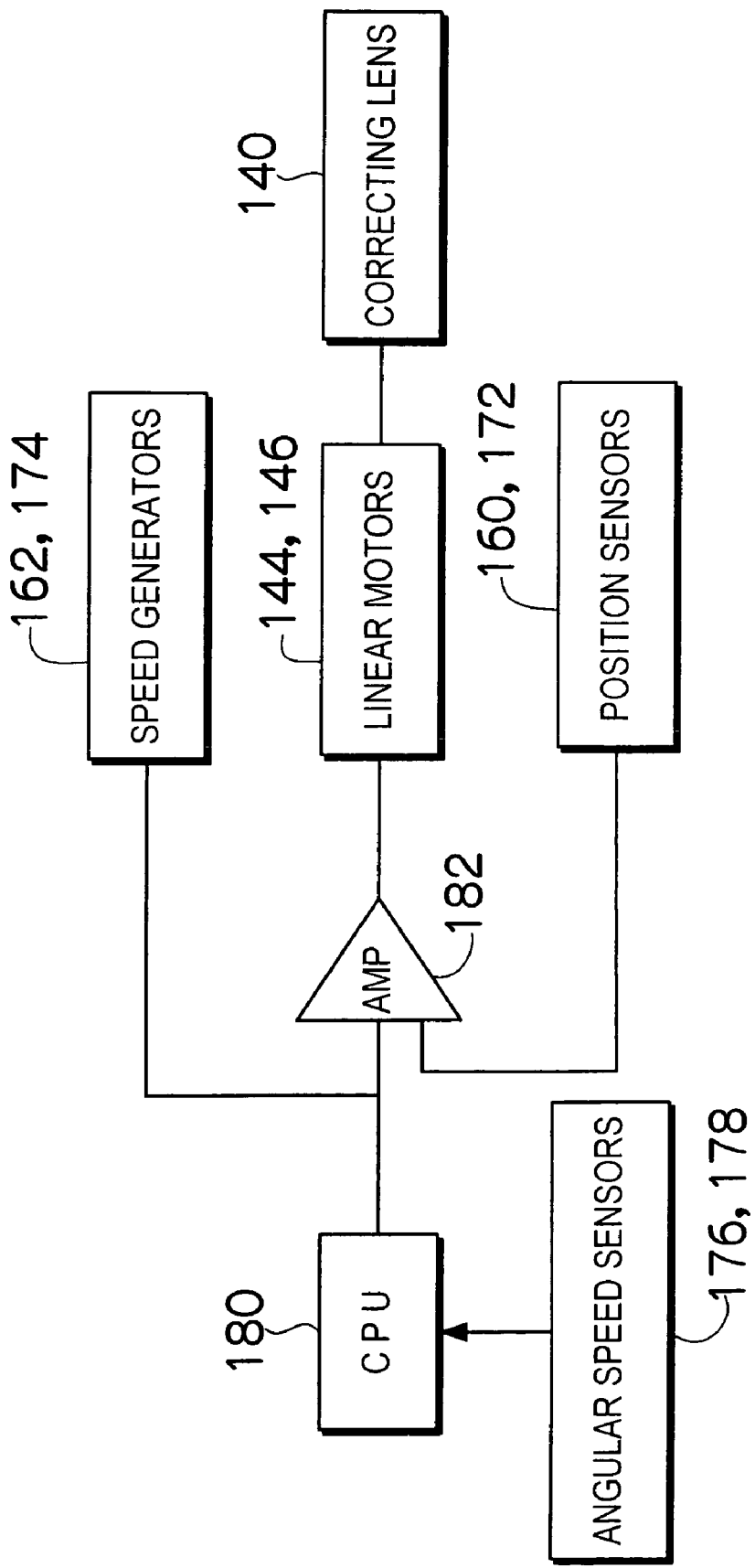
FIG. 13 is a block diagram showing a control system for the vibration isolator in FIG. 12.

FIG. 13 is a block diagram illustrating a drive control system for the correcting lens 140 in the vibration isolator 120. Angular speed sensors 176, 178 in FIG. 13 are arranged on the side and the top of the mount frame 117 of the lens supporter 116, respectively.

The angular speed sensor 176 detects the horizontal component of the vibration applied to the camera 118. The obtained information is output to a central processing unit (CPU) 180. The CPU 180 calculates the horizontal correction movement amount for the correction lens 140 in accordance with the information obtained from the angular speed sensor 176. An amplifier 182 amplifies a signal indicating the horizontal correction movement amount, and the signal is output to the linear motor 144 (see FIG. 12). The linear motor 144 extends or contracts the rod 144B in accordance with the signal from the CPU 180.

On the other hand, the angular speed sensor 178 detects the vertical component of the vibration applied to the camera 118. The obtained information is output to the CPU 180. The CPU 180 calculates the vertical correction movement amount for the correcting lens 140 in accordance with the information from the angular speed sensor 178. An amplifier 182 amplifies a signal indicating the vertical correction movement amount, and the signal is output to the linear motor 146. The linear motor 146 extends or contracts the rod 146B in accordance with the signal from the CPU 180.

According to the vibration isolator for the TV camera, when the CPU 180 receives the information from the angular speed sensor 176 or 178, the CPU 180 calculates the horizontal or vertical correction movement amount for the correcting lens 140, and outputs the signal indicating the horizontal correction movement amount to the linear motor 144 or 146. The linear motor 144 or 146 extends or contracts the rod 144B or 146B in accordance with the signal from the CPU 180, and moves the correction lens 140 to such a position as to correct the image blur. Consequently, the movement of the correcting lens 140 cancels the horizontal or vertical component to thereby correct the horizontal or vertical image blur.

While the correcting lens 140 is moving horizontally, the position sensor 160 or 172 determines the position of the connecting frame 156 or 168. A position signal indicating the position is compared with the signal indicating the correction movement amount outputted from the CPU 180. The CPU 180 feedback-controls the linear motor 144 or 146 so that the correcting lens 140 can be moved by the correction movement amount.

Figure 11:
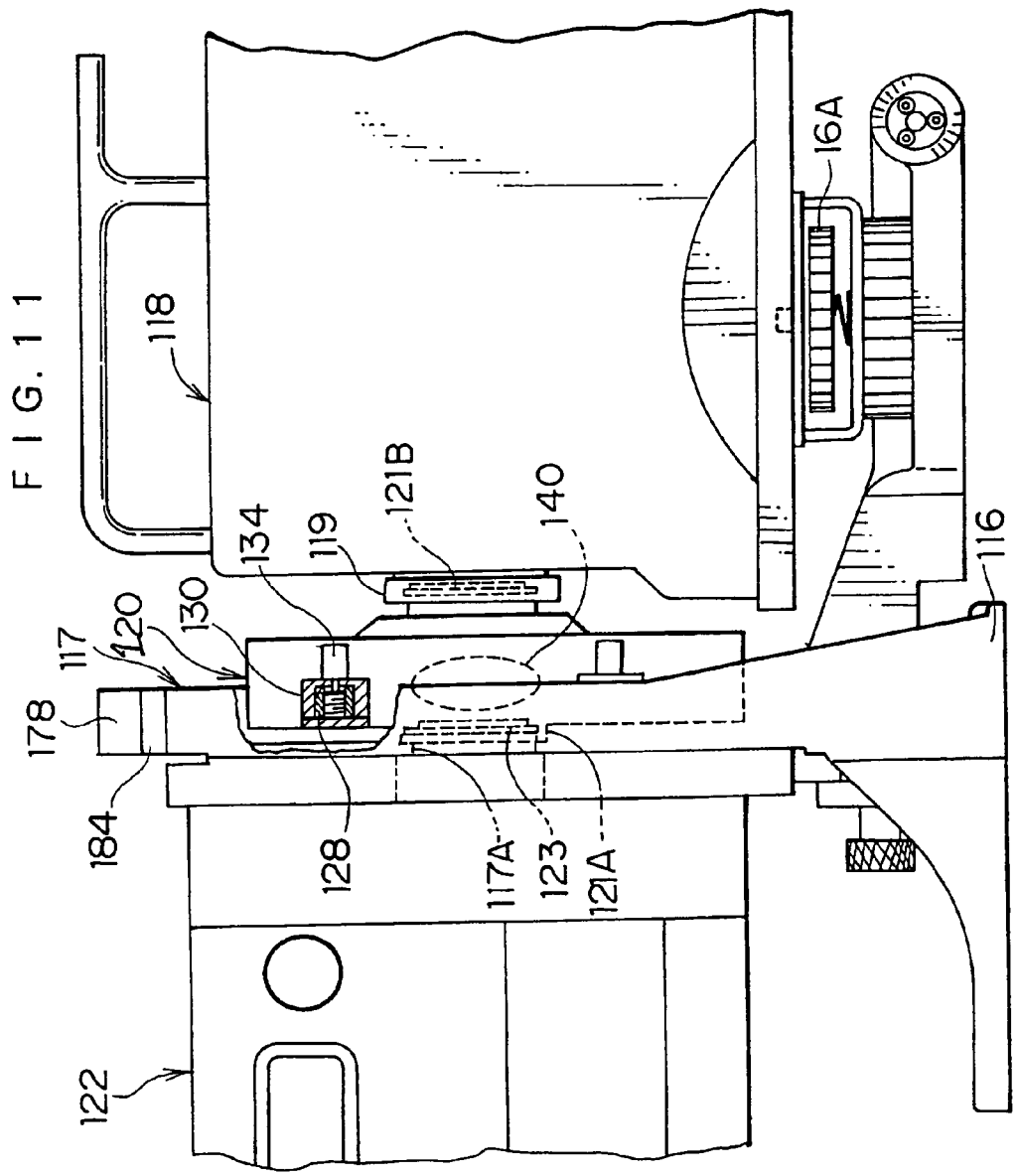
FIG. 11 is a side view showing the state wherein a lens supporter supports a camera and a lens device.

The angular speed sensor 178 is attached to the top of the mount frame 117 through an elastic body 184 made of rubber, sponge or the like as shown in FIG. 11. Even if the correction lens 140 is vibrated by the vibration isolator 120, the vibration is absorbed by the elastic body 184 not to be transmitted to the angular speed sensor 178. Thus, the angular speed sensor 178 can precisely determine the vertical component of the vibration applied to the camera 118.

The angular speed sensor 176 is attached to the side of the mount frame 117 through an elastic body (not shown). The vibration of the correction lens 140 is absorbed by the elastic body not to be transmitted to the angular speed sensor 178, and thus the angular speed sensor 176 can precisely determine the horizontal component of the vibration applied to the camera 118.

The angular speed sensors 176 and 178 are not necessarily attached to the mount frame 117 of the lens supporter 116, but they may be provided inside or outside of the camera 118, the body 121 of the vibration isolator 120, or the lens device 122. In this case, the angular speed sensors 176 and 178 are attached through the elastic bodies in the same way, the vibration of the correction lens 40 is not transmitted to the angular speed sensors 176 and 178.

The inner structure of the vibration isolator 120 is not limited to that in FIG. 12, and driving devices such as actuators may move the correcting lens 140.

The operation of the vibration isolator 120 will now be explained.

When the studio camera unit 110 is vibrated, the angular speed sensors 176 and 178 determine the horizontal and vertical components of the vibration, respectively, and the CPU 180 calculates the correction movement amounts according to the components. Then, the CPU 180 drives the linear motors 144 and 146 to move the correcting lens 140. This cancels the vibration of the studio camera unit 110 to correct the image blur.

However, the vibration isolator 120 can be vibrated by the linear motors 144 and 146. If the vibration that does not cause the image blur is transmitted to the angular speed sensors 176 and 178, the vibration isolation is deteriorated. But, in the vibration isolator 120, the angular speed sensors 176 and 178 are attached through the elastic bodies 184, which absorb the vibration of the vibration isolator 120 not to transmit the vibration to the angular speed sensors 176 and 178. Thus, the angular speed sensors 176 and 178 do not determine the vibration of the vibration isolator 120. Therefore, the angular speed sensors 176 and 178 can precisely determine the vibration of the studio camera unit 110, and the vibration isolator 120 can precisely prevent the image blur.

As described above, the vibration isolator 120 according to the first embodiment can precisely determine the vibration of the studio camera unit 110 to completely prevent the image blur since the angular speed sensors 176 and 178 are attached through the elastic bodies 184.

Figure 14:
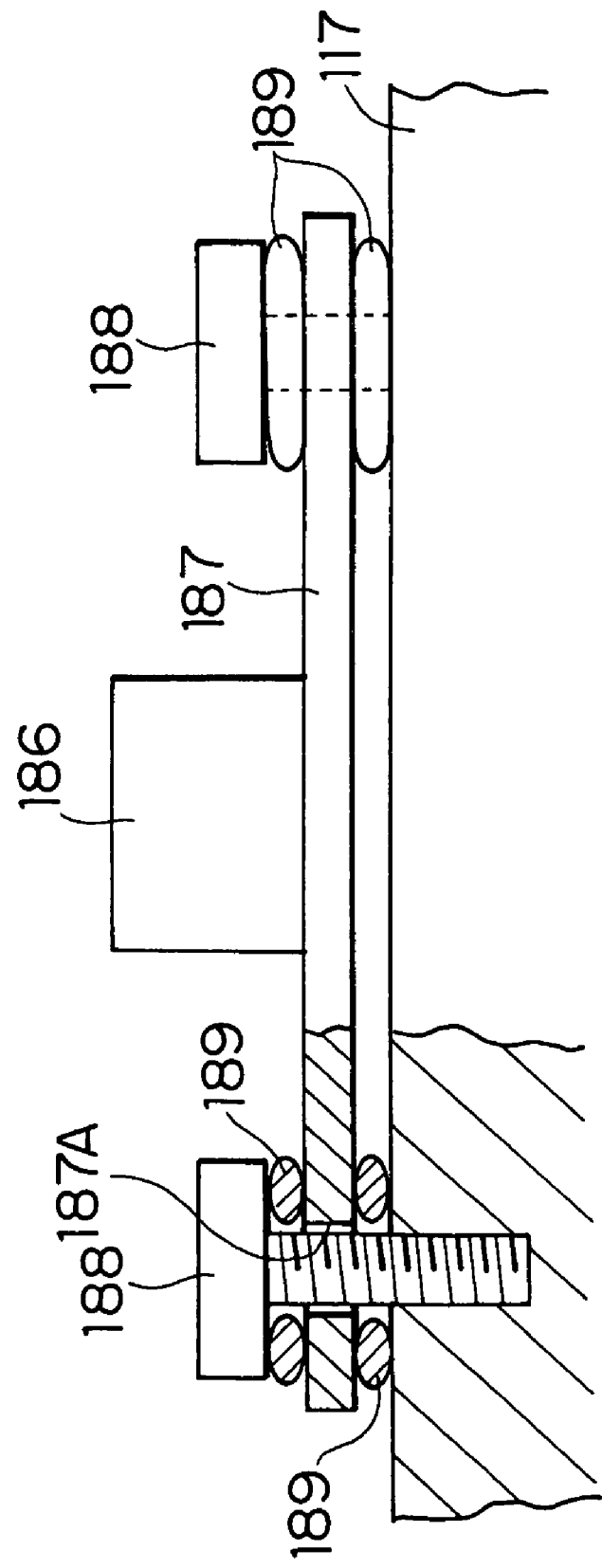
FIG. 14 is a side view showing an angular sensor attached in a way that is different from that in FIG. 11.

The angular speed sensors 176 and 178 are directly attached to the elastic bodies 184 in the first embodiment, but the present invention is not limited to this. For example, an angular speed sensor 186 in FIG. 14 is attached to the mount frame 117 of the lens supporter 116 through a sensor board 187. Holes 187A (only one is shown in FIG. 14) are formed in the sensor board 187, and a screw 188 is inserted in each hole 187A to be engaged in the mount frame 117. Elastic O-rings 189 are arranged around the screw 188 between the head of the screw 188 and the sensor board 187 and between the sensor board 187 and the mount frame 117. Thus, the sensor board 187 is supported through the O-rings 189. Therefore, the vibration of the vibration isolator 120 is absorbed by the O-rings 189 not to be transmitted to the angular speed sensor 186.

The elastic bodies 184 are used for absorbing the vibration in the first embodiment, but any member absorbing the vibration that does not cause the image blur can be used.

Figure 15:
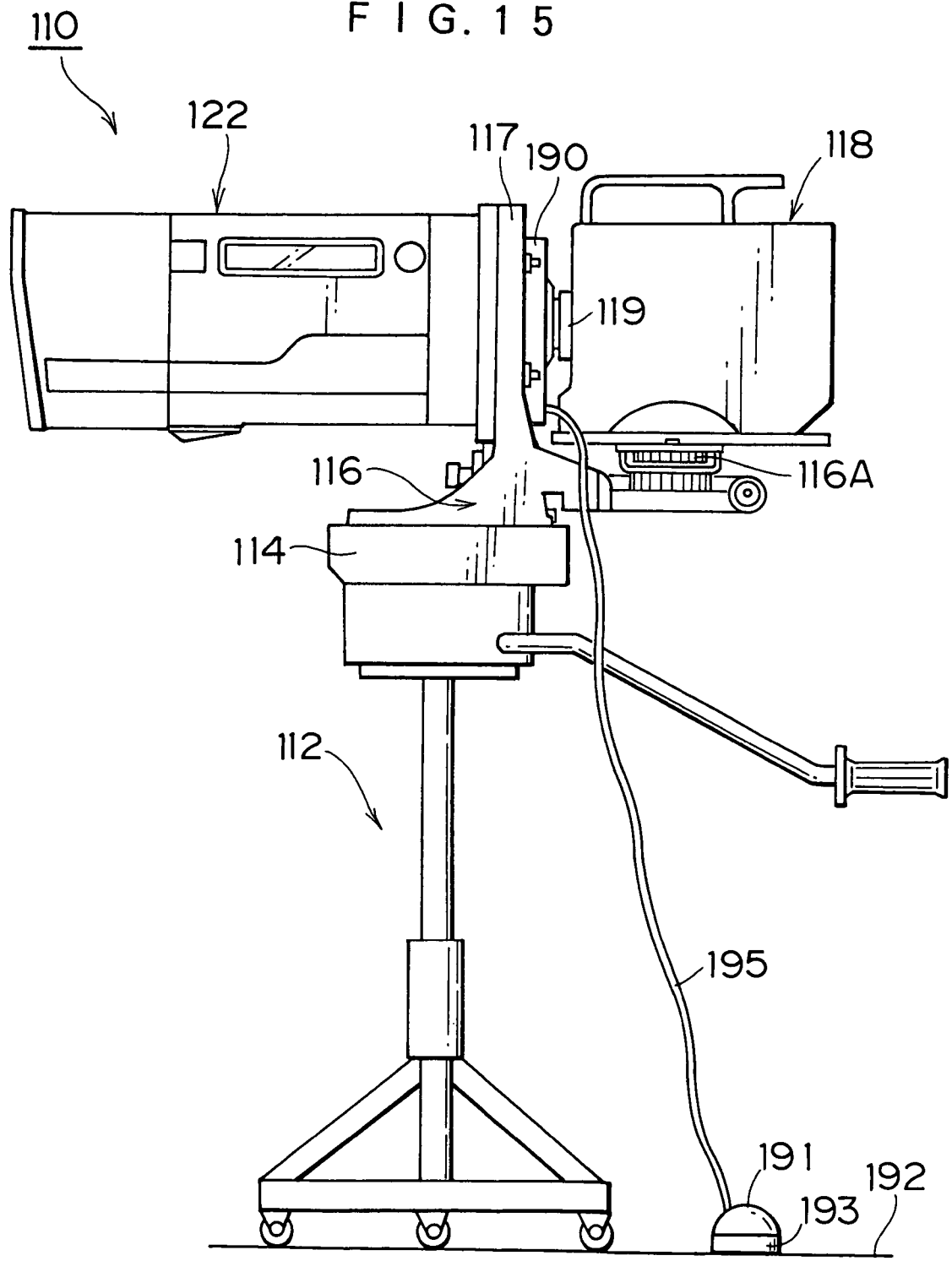
FIG. 15 is a view showing the whole studio camera unit to which a vibration isolator of a second embodiment is applied.
Figure 16:
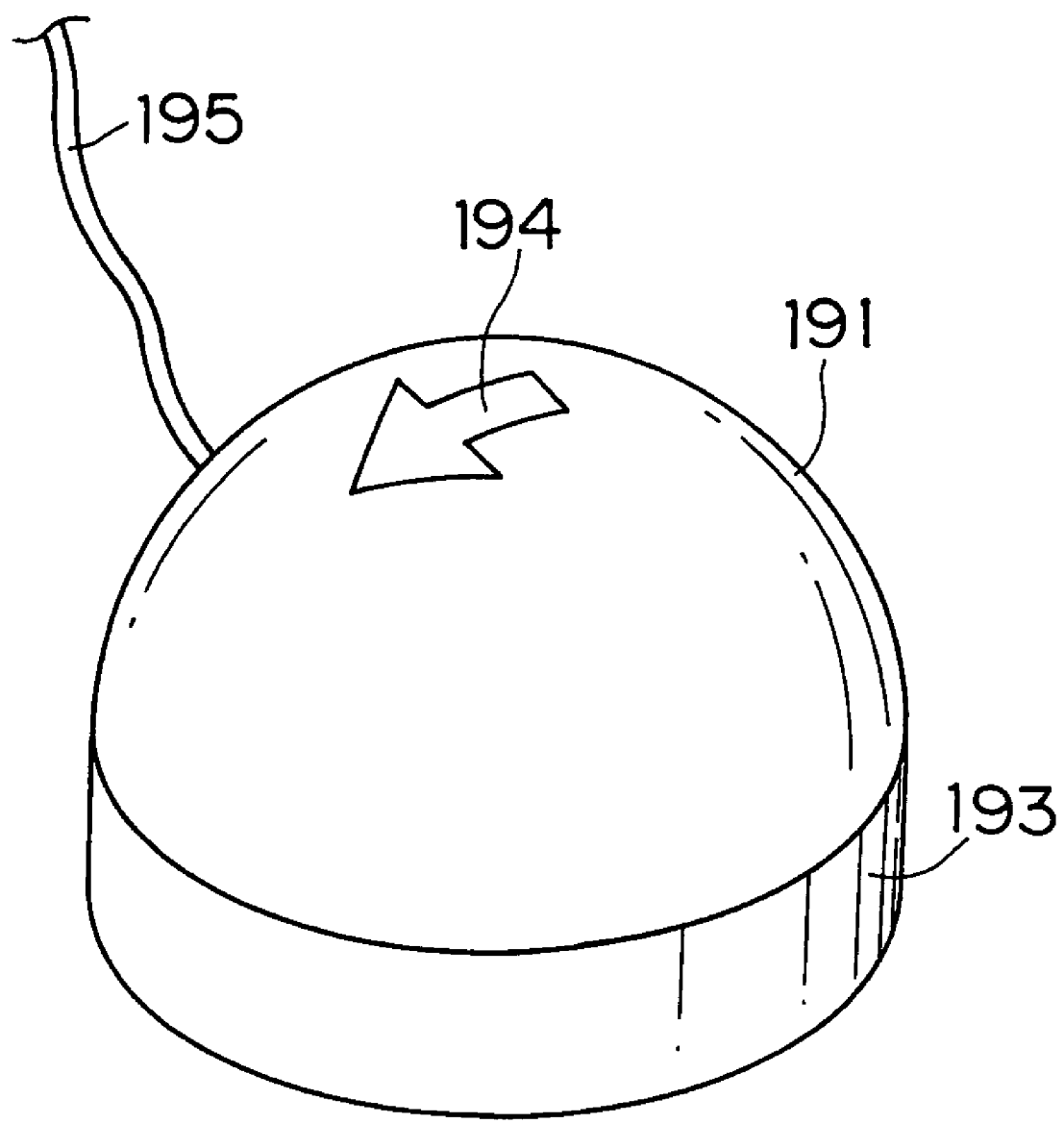
FIG. 16 is a perspective view showing an angular sensor in FIG. 15.

FIG. 15 shows the studio camera unit 110 to which a vibration isolator 190 according to the second embodiment of the present invention is applied, and FIG. 16 is a perspective view showing an angular speed sensor 191 in FIG. 15. In FIGS. 15 and 16, members that are the same as or similar to members in FIG. 10 are denoted by the same numerals, and they will not be explained.

As shown in FIGS. 15 and 16, in the vibration isolator 190, the angular speed sensor 191 is separate from the studio camera unit 110 and arranged on a floor 192. The angular speed sensor 191 is substantially shaped like a hemisphere so that it can not be arranged upside down. A disk 193 made of an elastic body such as rubber is attached to the bottom of the angular speed sensor 191, and the angular speed sensor 191 is arranged on the floor 192 through the rubber board 193. Thus, a subtle vibration that does not cause the image blur is not transmitted to the angular speed sensor 191.

An index 194 indicating a direction is formed on the angular speed sensor 191, and the angular speed sensor 191 is arranged in such a way that the direction of the index 194 is the same as the direction of the optical axis of the studio camera unit 110. The index 194 is an arrow in FIG. 16, but it may be characters such as "FRONT" and "BACK."

In the vibration isolator 190 according to the second embodiment, when the floor 192 is vibrated, the angular speed sensor 191 determines the vertical and horizontal components of the vibration of the floor 192. The information on the vibration is outputted to the CPU 180 through a cable 195, and the CPU 180 calculates correction movement amounts for the correcting lens 140. The linear motors 44 and 46 move the correcting lens 140 according to the correction movement amounts to prevent the image blur. At this time, a vibration can occur in the vibration isolator 190, but the vibration is never transmitted to the angular speed sensor 191 since the angular speed sensor 191 is separate from the studio camera unit 110. Thus, the angular speed sensor 191 can precisely determine the vibration that causes the image blur, and therefore the vibration isolator 190 can precisely prevent the image blur.

The angular speed sensor 191 is arranged on the floor 192 in the embodiment, but it only needs to be separate from the studio camera unit 110.

The angular speed sensor 191 is not necessarily hemisphere-shaped, but it may be rectangular. In this case, an index showing the top and the bottom of the angular speed sensor 191 is needed.

The disk 193 may have an adhesive layer on its bottom so that the angular speed sensor 191 can be stuck on the floor 192 to be fixed.

In the second embodiment, the angular speed sensor 191 is connected to the vibration isolator 190 through the cable 195 and the angular speed sensor 191 transmits the information on the vibration to the CPU 180 through the cable 195. But, the angular speed sensor 191 may transmit the information by wireless.

The angular speed sensors 176, 178 and 191 are used as the vibration determining devices in the first and second embodiments, but acceleration sensors may be used.

As set forth hereinabove, according to the present invention, the vibration isolator determines the speed of the vibration applied to the camera, and differentiates and integrates the speed, and corrects the integrated value to zero when the differentiated value is zero, and determines the position of the correcting optical system according to the integrated value. Thus, the oscillation center of the correcting optical system is set at the origin, and the unwanted influence due to the noise components in the output signal from the vibration determining device can be eliminated. Therefore, the operating range of the correcting optical system is the maximum, and the vibration isolator's full ability is realized.

As set forth hereinabove, according to the present invention, the vibration isolator starts the vibration isolation the predetermined time after the switching device turns on the vibration isolation. Thus, the vibration caused by the operation of the switching device can be canceled, and the image gap can be prevented when the switching device turns on the vibration isolation.

After the switching device turns on the vibration isolation, the vibration isolation is not started until the vibration isolating device comes to the origin. Thus, the vibration isolator can prevent the image gap without changing the oscillation center of the vibration isolating device from the origin. Therefore, the image gap can be prevented when the switching device turns on the vibration isolation while the vibration isolation is not deteriorated.

After the switching device turns on the vibration isolation, the driving amount of the vibration isolating device is gradually increased and then the vibration isolation is started. Thus, the vibration isolator can prevent the image gap without changing the oscillation center of the vibration isolating device from the origin. Therefore, the image gap can be prevented when the switching device turns on the vibration isolation while the vibration isolation is not deteriorated.

After the switching device turns off the vibration isolation, the driving amount of the vibration isolating device is gradually decreased and then the vibration isolating device is stopped at the origin. Thus, the image gap can be prevented when the switching device turns off the vibration isolation.

The vibration isolator starts calculating the driving signal after the switching device turns on the vibration isolation to save electricity. If the CPU calculates the driving signal, it can be efficiently used for another processing while the vibration isolation is off.

As set forth hereinabove, according to the vibration isolator of the present invention, the vibration that does not cause the image blur is not transmitted to the determining device. Thus, the determining device can precisely determine the vibration that causes the image blur to precisely prevent the image blur.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A vibration isolator that prevents an image blur due to a vibration of a camera by moving a correcting optical system, the vibration isolator comprising:
a vibration speed determining device that determines a speed of the vibration;
a differentiating device that differentiates the speed determined by the vibration speed determining device;
an integrating device that integrates the speed determined by the vibration speed determining device;
a correcting device that corrects the integrated value calculated by the integrating device to substantially zero when the differentiated value calculated by the differentiating device is substantially zero such that an unwanted component of the vibration speed is substantially eliminated during image blur prevention; and
a controlling device that controls a position of the correcting optical system according to the integrated value to thereby prevent the image blur due to the vibration of the camera.

2. The vibration isolator as defined in claim 1, wherein the vibration isolator prevents the image blur by moving a vibration isolating device according to a vibration of a vibration determining device, the vibration isolator further comprising:
a switching device that turns on and off vibration isolation,
wherein the controlling device keeps the vibration isolating device at a predetermined position until a predetermined time passes after the switching device turns on the vibration isolation and moves the vibration isolating device according to the vibration after the predetermined time passes.

3. The vibration isolator as defined in claim 2, wherein the controlling device stops the vibration isolating device at the predetermined position when the switching device turns off the vibration isolation.

4. The vibration isolator as defined in claim 2, wherein the controlling device gradually decreases a driving amount of the vibration isolating device to stop the vibration isolating device at the predetermined position after the switching device turns off the vibration isolation.

5. The vibration isolator as defined in claim 2, wherein the controlling device does not calculate a driving signal for driving the vibration isolating device when the vibration isolation is off and starts calculating the driving signal after the switching device turns on the vibration isolation.

6. The vibration isolator as defined in claim 1, wherein the vibration isolator prevents the image blur by moving a vibration isolating device according to a vibration of a vibration determining device, the vibration isolator further comprising:
a switching device that turns on and off vibration isolation,
wherein the controlling device keeps the vibration isolating device at an origin until a position of the vibration isolating device for preventing the image blur is the origin after the switching device turns on the vibration isolation and moves the vibration isolating device according to the vibration after the position of the vibration isolating device for preventing the image blur is the origin.

7. The vibration isolator as defined in claim 6, wherein the controlling device stops the vibration isolating device at the position when the switching device turns off the vibration isolation.

8. The vibration isolator as defined in claim 6, wherein the controlling device gradually decreases a driving amount of the vibration isolating device to stop the vibration isolating device at the position after the switching device turns off the vibration isolation.

9. The vibration isolator as defined in claim 6, wherein the controlling device does not calculate a driving signal for driving the vibration isolating device when the vibration isolation is off and starts calculating the driving signal after the switching device turns on the vibration isolation.

10. A vibration isolator as defined in claim 1, wherein the vibration isolator prevents the image blur by moving a vibration isolating device according to a vibration of a vibration determining device, the vibration isolator further comprising:
a switching device that turns on and off vibration isolation,
wherein the controlling device starts moving the vibration isolating device with a driving amount that is smaller than that for preventing the image blur when the switching device turns on the vibration isolation and drives the vibration isolating device while gradually increasing the driving amount to that for preventing the image blur.

11. The vibration isolator as defined in claim 10, wherein the controlling device stops the vibration isolating device at a position when the switching device turns off the vibration isolation.

12. The vibration isolator as defined in claim 10, wherein the controlling device gradually decreases a driving amount of the vibration isolating device to stop the vibration isolating device at a position after the switching device turns off the vibration isolation.

13. The vibration isolator as defined in claim 10, wherein the controlling device does not calculate a driving signal for driving the vibration isolating device when the vibration isolation is off and starts calculating the driving signal after the switching device turns on the vibration isolation.

14. The vibration isolator as defined in claim 1, wherein the controlling device controls a movement of a correcting lens of the correcting optical system within a plane that is perpendicular to an optical axis of the camera.

15. The vibration isolator as defined in claim 1, further comprising:
a low pass filter for filtering a vibration speed signal from the vibration speed determining device,
wherein the differentiating device and the integrating device respectively differentiates and integrates the filtered vibration speed signal from the low pass filter.

16. The vibration isolator as defined in claim 1, wherein the correcting device corrects the integrated value calculated by the integrating device to substantially zero when both conditions of the differentiated value calculated by the differentiating device is substantially zero and when a displacement of a correcting lens of the correcting optical system from an oscillation center is greater than a predetermined threshold value.

17. The vibration isolator as defined in claim 1, wherein the correcting device corrects the integrated value calculated by the integrating device to substantially zero when both conditions of the differentiated value calculated by the differentiating device is substantially zero and when a restriction of an oscillation range of a correcting lens of the correcting optical system becomes greater than a predetermined threshold.

18. The vibration isolator as defined in claim 17, wherein the restriction of the oscillation range of the correcting lens of the correcting optical system is due to a center of oscillation of the correcting lens being displaced from an origin.

19. The vibration isolator as defined in claim 1, further comprising:
a switching device configured to turn on and off vibration isolation; and
a driving circuit configured to receive a driving signal from the controlling device and moving the correcting optical system based on the driving signal from the controlling device,
wherein after the switching device turns on the vibration isolation, the controlling device calculates a compensating driving signal necessary to compensate for the image blur due to the vibration of the camera based on the integrated value calculated by the integrating device, and
wherein the driving signal applied to the driving circuit from the controlling device is based on the calculated compensating driving signal.

20. The vibration isolator as defined in claim 19,
wherein for a predetermined period of time after the switching device turns on the vibration isolation, the controlling device does not output the driving signal, and
wherein after the predetermined period of time, the controlling device outputs the compensating driving signal as the driving signal.

21. The vibration isolator as defined in claim 19,
wherein after the switching device turns on the vibration isolation, the controlling device does not output the driving signal until when the calculated compensating driving signal becomes zero, and
wherein starting when the calculated compensating driving signal becomes zero, the controlling device outputs the compensating driving signal as the driving signal.

22. The vibration isolator as defined in claim 19,
wherein during a predetermined period of time after the switching device turns on the vibration isolation, the controlling device outputs a portion of the calculated compensating driving signal as the driving signal,
wherein the portion gradually increases during the predetermined period such that the driving signal at the end of the predetermined period is the full compensating driving signal, and
wherein the portion is less than the full compensating driving signal at a beginning of the predetermined period.

23. The vibration isolator as defined in claim 19,
wherein during a predetermined period of time after the switching device turns off the vibration isolation, the controlling device outputs a portion of the calculated compensating driving signal as the driving signal,
wherein the portion gradually decreases during the predetermined period such that the driving signal at the end of the predetermined period is zero.

24. The vibration isolator as defined in claim 1, wherein the correcting device is configured to correct the integrated value calculated by the integrating device to substantially zero when the differentiated value calculated by the differentiating device is substantially zero without regard to a position of the correcting optical system prior the correction of the integrated value.

25. A vibration isolator that prevents an image blur due to a vibration of a camera by moving a correcting optical system, the vibration isolator comprising:
a vibration acceleration determining device that determines an acceleration of the vibration;
an integrating device that twice-integrates the acceleration determined by the vibration acceleration determining device;
a correcting device that corrects the twice-integrated value calculated by the integrating device to substantially zero when the acceleration value determined by the vibration acceleration determining device is substantially zero such that an unwanted component of the vibration speed is substantially eliminated during image blur prevention; and
a controlling device that controls a position of the correcting optical system according to the corrected twice-integrated value to thereby prevent the image blur due to the vibration of the camera.

26. The vibration isolator as defined in claim 25, wherein the correcting device corrects the twice-integrated value calculated by the integrating device to substantially zero when both conditions of the acceleration value determined by the vibration acceleration determining device is substantially zero and when a displacement of a correcting lens of the correcting optical system from an oscillation center is greater than a predetermined threshold value.

27. The vibration isolator as defined in claim 25, wherein the correcting device corrects the twice-integrated value calculated by the integrating device to substantially zero when both conditions of the acceleration value determined by the vibration acceleration determining device is substantially zero and when a restriction of an oscillation range of a correcting lens of the correcting optical system becomes greater than a predetermined threshold.

28. The vibration isolator as defined in claim 27, wherein the restriction of the oscillation range of the correcting lens of the correcting optical system is due to a center of oscillation of the correcting lens being displaced from an origin.

29. The vibration isolator as defined in claim 25, further comprising:
a switching device configured to turn on and off vibration isolation; and
a driving circuit configured to receive a driving signal from the controlling device and moving the correcting optical system based on the driving signal from the controlling device,
wherein after the switching device turns on the vibration isolation, the controlling device calculates a compensating driving signal necessary to compensate for the image blur due to the vibration of the camera based on the twice-integrated value calculated by the integrating device, and
wherein the driving signal applied to the driving circuit from the controlling device is based on the calculated compensating driving signal.

30. The vibration isolator as defined in claim 29,
wherein for a predetermined period of time after the switching device turns on the vibration isolation, the controlling device does not output the driving signal, and
wherein after the predetermined period of time, the controlling device outputs the compensating driving signal as the driving signal.

31. The vibration isolator as defined in claim 29, wherein after the switching device turns on the vibration isolation, the controlling device does not output the driving signal until when the calculated compensating driving signal becomes zero, and wherein starting when the calculated compensating driving signal becomes zero, the controlling device outputs the compensating driving signal as the driving signal.

32. The vibration isolator as defined in claim 29, wherein during a predetermined period of time after the switching device turns on the vibration isolation, the controlling device outputs a portion of the calculated compensating driving signal as the driving signal, wherein the portion gradually increases during the predetermined period such that the driving signal at the end of the predetermined period is the full compensating driving signal, and wherein the portion is less than the full compensating driving signal at a beginning of the predetermined period.

33. The vibration isolator as defined in claim 29, wherein during a predetermined period of time after the switching device turns off the vibration isolation, the controlling device outputs a portion of the calculated compensating driving signal as the driving signal, wherein the portion gradually decreases during the predetermined period such that the driving signal at the end of the predetermined period is zero.

34. The vibration isolator as defined in claim 25, wherein the correcting device that corrects the twice-integrated value calculated by the integrating device to substantially zero when the acceleration value determined by the vibration acceleration determining device is substantially zero without regard to a position of the correcting optical system prior the correction of the twice-integrated value.

* * * * *